United States Patent [19]

Reeves et al.

[11] Patent Number: 4,703,959
[45] Date of Patent: Nov. 3, 1987

[54] THREADED PIPE CONNECTION WITH COMPRESSIBLE SEAL RING

[75] Inventors: Doyle E. Reeves; Keith C. Mott, both of Houston, Tex.

[73] Assignee: Hydril Company, Houston, Tex.

[21] Appl. No.: 828,191

[22] Filed: Feb. 10, 1986

[51] Int. Cl.⁴ ............................................. F16L 25/00
[52] U.S. Cl. ................................. 285/332.3; 285/334; 285/355
[58] Field of Search ................. 285/332.3, 332.2, 334, 285/333, 355

[56] References Cited

U.S. PATENT DOCUMENTS

| Re. 30,647 | 6/1981 | Blose | 285/332.2 |
|---|---|---|---|
| 2,177,100 | 10/1939 | Frame | 285/334 |
| 2,179,202 | 11/1939 | Simpson | 285/355 X |
| 2,380,690 | 7/1945 | Graham | 285/332.3 X |
| 2,474,556 | 6/1949 | Stone | 285/332.3 X |
| 2,907,589 | 10/1959 | Knox | 285/95 |
| 2,980,451 | 4/1961 | Taylor et al. | 285/332.3 |
| 3,047,316 | 7/1962 | Wehring et al. | 285/334 |
| 3,158,390 | 11/1964 | Woodling | 285/334 |
| 4,192,533 | 3/1980 | Blose | 285/334 |
| 4,433,862 | 2/1984 | Raulins et al. | 285/350 |
| 4,458,925 | 7/1984 | Raulins et al. | 285/332.2 |
| 4,489,963 | 12/1984 | Raulins et al. | 285/350 |
| 4,496,175 | 1/1985 | Morris | 285/334 |

Primary Examiner—Richard J. Scanlan, Jr.
Attorney, Agent, or Firm—Vaden, Eickenroht, Thompson & Boulware

[57] ABSTRACT

A threaded pipe connection is disclosed that has threads the flanks, roots, and crests thereof form thread seals when the connection is made up and that has a seal ring of resilient material that is trapped in a cavity between a groove in either the box or the pin and the thread seals to provide a secondary seal.

12 Claims, 9 Drawing Figures

THREADED PIPE CONNECTION WITH COMPRESSIBLE SEAL RING

This invention relates to threaded connections for oil country tubular products, such as drill pipe, tubing, and casing. In particular, the invention relates to threaded connections that employ a resilient seal ring in addition to metal-to-metal or thread seals and, specifically, to a connection employing wedge-shaped threads such as those described in pending U.S. patent application, Ser. No. 489,739, filed Apr. 29, 1983, entitled "Tubular Connection", abandoned; refiled on May 27, 1986 as FWC Ser. No. 868,887 and pending U.S. patent application, Ser. No. 589,128, filed Mar. 13, 1984, entitled "Improved Tubular Connection", abandoned; refiled on May 27, 1986 as FWC Ser. No. 868,888, now abandoned.

The use of resilient seal rings to provide a seal between the pin and box of a threaded connection is not new. For example, see U.S. Pat. Nos. 2,980,451, 3,047,316, and 4,489,963. In all of these patents, an annular groove is formed in the threaded portion of the box to provide a cavity in which a resilient seal ring is located. The threads on the pin, when the joint is made up, compress the resilient material of the seal ring in the cavity and extrude the material laterally of the groove. With the type of threaded connections described in these patents, there is space into which the resilient material of the seal ring can be extruded as the joint is made up. Using a threaded connection, such as described in the above-identified patent application, where the roots and crests of the threads and the flanks of the threads engage to form thread seals throughout the length of the threads, no such space exists.

Therefore, it is an object of this invention to provide such a threaded connection with a resilient seal.

It is a further object of this invention to provide such a connection with a seal ring of resilient material located between the ends of the threads that is confined to the cavity provided by the groove as the connection is made up and the threads compress the ring sufficiently both radially and axially (volumetric compression) to form a seal between the pin and the box of the connection.

These and other objects, advantages, and features of this invention will be apparent to those skilled in the art from a consideration of this specification, including the appended claims and attached drawings.

IN THE DRAWINGS

FIGS. 2A-5A indicate where the sections of FIGS. 2-5 are taken.

Figure 1:
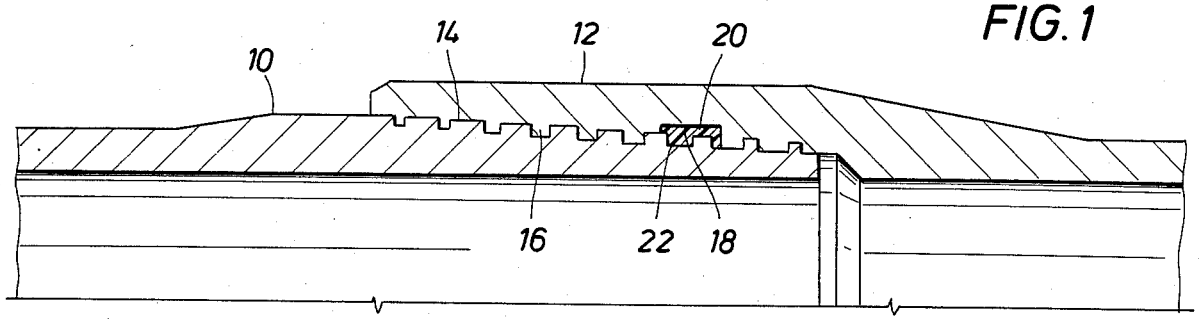
FIG. 1 is a sectional view through the threaded connection of this invention.

In FIG. 1, pin 10 is connected to box 12 by mating wedge-shaped threads 14 on the pin and 16 on the box. In accordance with this invention, either the box or the pin is provided with an annular groove to provide a cavity between the groove and the threads on the box or pin in which is located a resilient seal ring to provide the joint with a secondary seal, the seal being secondary to the thread seals formed between the crests and roots of the threads and the flanks of the threads in the manner described in the above-identified patent applications. The threads are shown as square threads in the drawing for convenience. Usually, they are shaped like a dovetail. In the embodiment shown, groove 18 is located in box 12 and seal ring 20 is located in cavity 22 formed by the groove and the threads on the pin.

The seal ring must be made of a material having sufficient resiliency to be compressed to some extent while exerting sufficient resistance to the compression for the internal pressure to form an adequate seal. In addition, the material must be capable of being forced into the various shapes of cavity 22 shown in FIGS. 2-5 without an excessive amount of tearing of the material. One such material found adequate is polytetrafluoroethylene. The seal ring must conform to different cross-sectional shapes of cavity 22 because the groove is cylindrical, the thread helix is tapered, and the thread width changes as the connection is made up.

This can best be seen in FIGS. 2-5. These are four sections taken through the cavity formed by the groove and the threads when the joint is made up showing four different shapes the resilient ring must take to accommodate the threads on the pin that extend into the groove and compress the seal. Each section is taken at the same axial distance from the face of the box and the planar section passes through the axis of the box and the pin. Although four different shaped cavities are shown, each one smoothly evolves into the next because of the helical nature of the threads passing through the groove of the box. FIGS. 2A-5A show the extent of the applicability of the Figure with which they are associated. Changes in the width of the groove, the lead of the threads, and the groove position would alter the way these cavities are shown and the extent to which they would be applicable.

Figure 2:
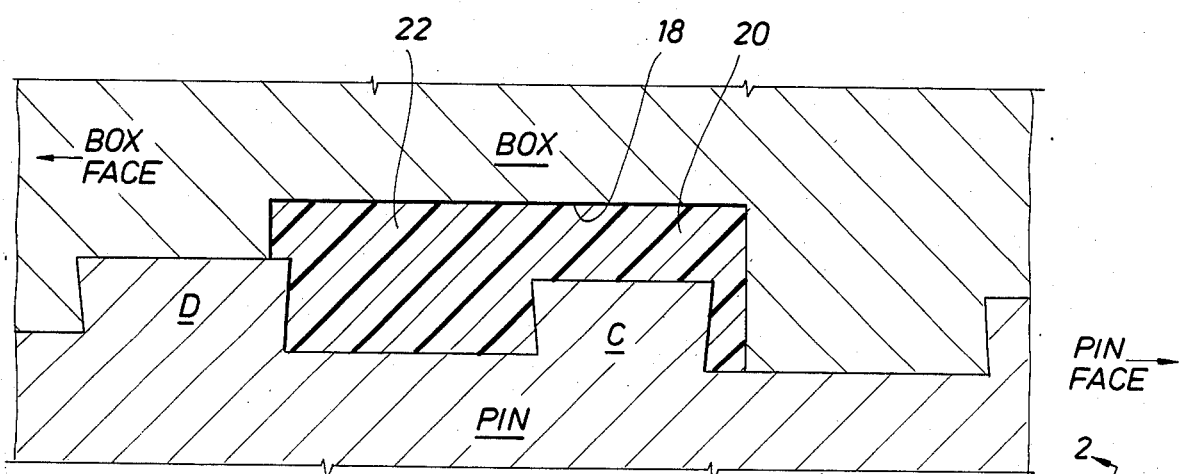
FIGS. 2-5 are four sectional views through the cavity between the groove and the threads in which the seal ring of the joint of FIG. 1 is located.
Figure 2A:
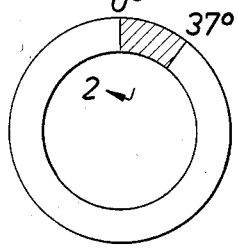
Figure 3:
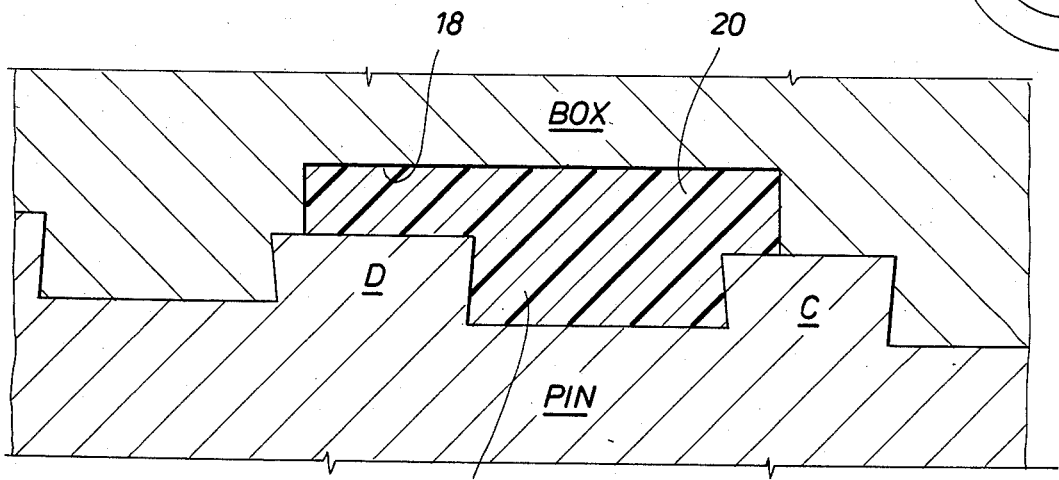
Figure 3A:
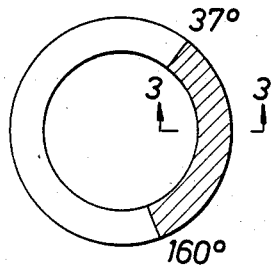
Figure 4:
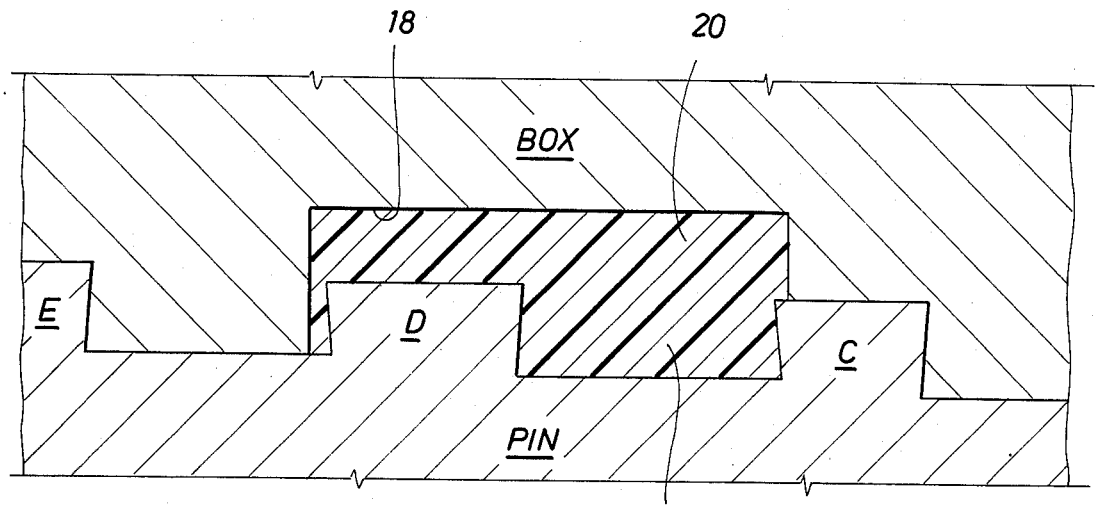
Figure 4A:
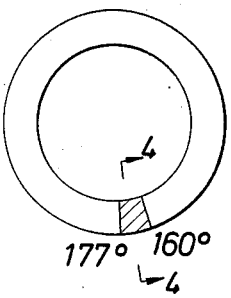
Figure 5:
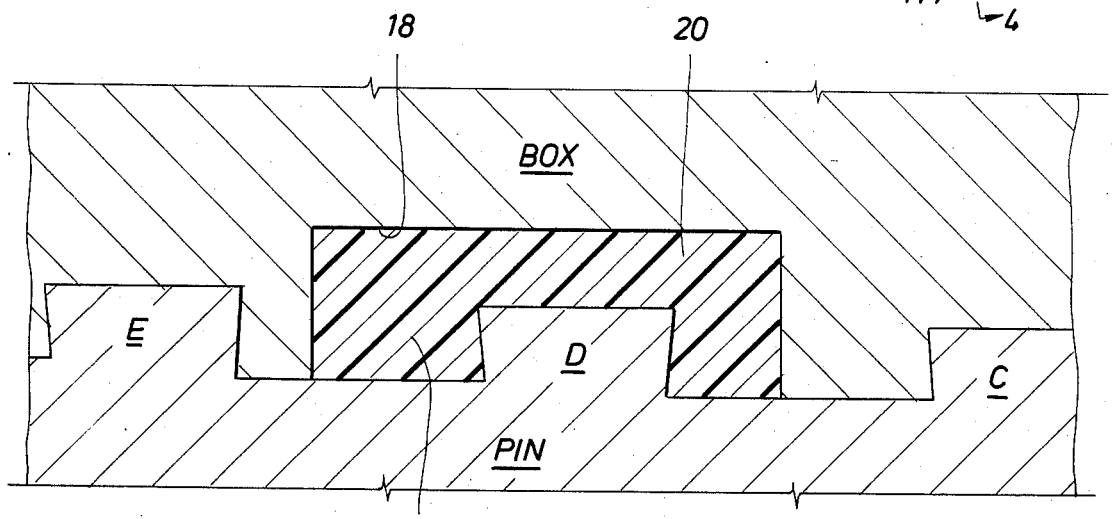
Figure 5A:
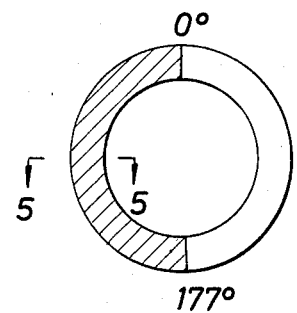

In FIG. 2, thread C is wholly within cavity 22 while thread D is just entering the cavity. The cross-sectional area of the cavity at this point is somewhat less than the cross-sectional area of the cavity extending from about 37° to 160°, as shown in FIG. 3. Here thread C has moved partially out of the cavity, while thread D is still not quite entirely in the cavity. FIG. 4 shows the configuration of the seal ring in the cavity through the short distance between about 160° to 177° of the total 360° extent of the seal ring and groove. Here, thread C is moving out of the cavity while thread D has moved completely into the cavity. In FIG. 5, the cavity has the largest cross-sectional area available to the seal ring since only thread D is located in the cavity and this configuration extends from about 177° back to 0°.

As explained above, since the flanks of the threads on each side of the groove and the roots and crests of the threads on each side of the groove form metal-to-metal seals when the joint is made up, with the crests and roots engaging first, excess material that would interfere with the makeup of the joint should not be extruded out of the groove. Consequently, in accordance with this invention, the seal ring is designed to have a volume after volumetric compression substantially equal to the volume available to it in the cavity when the joint is made up. This eliminates any need for lateral extrusion of the resilient material out of the groove when the joint is made up.

In order to provide a seal using a seal ring made of polytetrafluoroethylene, it has been determined that the radial thickness of the seal ring should be such that it will be compressed volumetrically between 8 to 15% when the joint is made up. With the groove substantially filled by the seal ring and prevented from being extruded from the groove by the adjacent threads, this amount of compression will provide ample compression to the resilient material of the seal ring to form an adequate seal between the seal ring and the box and the pin. Seal rings of other material may require somewhat different amounts of compression.

From the foregoing it will be seen that this invention is one well adapted to attain all of the ends and objects hereinabove set forth, together with other advantages which are obvious and which are inherent to the apparatus.

Because many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a threaded member, a box on one end having tapered, internal, generally dovetail-shaped threads that increase in width in one direction and a pin on the other end having external, tapered, generally dovetail-shaped threads that increase in width in the other direction, said threads on both the box and the pin being designed to engage mating threads on a pin and box and form thread seals between the flanks of the threads and between the roots and crests of the threads with the roots and crests engaging before the flanks, the improvement comprising an annular groove intermediate the ends of the threads on one of the box and pin to form a cavity between the groove and the threads on the other of the box and pin with which it is connected and a ring-shaped seal member of compressible material located in the annular groove, said seal member having a volume such that its volume will be substantially equal to the volume of the cavity after its volume is reduced up to about 15% when it is compressed by the mating threads extending into the groove and it is trapped in the cavity by the thread seals formed when the roots and crests of the mating threads engage.

2. The threaded member of claim 1 in which the threads are of dovetailed shape in cross-section.

3. The threaded member of claim 1 in which the width of the annular groove is equal to or greater than the pitch of the threads.

4. The threaded member of claims 1 or 2 in which the annular groove is in the box.

5. The threaded member of claim 1 in which the volume of the seal ring is reduced between 8–15%.

6. The threaded member of claims 1 or 5 in which the seal member is made of polytetrafluoroethylene.

7. In a threaded pipe connection comprising a box having tapered, internal, generally dovetail-shaped threads with flat roots and crests that are parallel to the longitudinal axis of the pipe and a pin having tapered, external, generally dovetail-shaped threads with flat roots and crests that are parallel to the longitudinal axis of the pipe for mating with the internal threads of the box to make up the joint, said threads increasing in width in one direction on the box and in the other direction on the pin so the roots, crests, and flanks of the threads engage and form thread seals with the roots and crests engaging before the flanks when the connection is made up to seal the connection the improvement comprising, an annular groove intermediate the ends of the threads on one of the box and pin to form a cavity between the groove and the threads on the other of the box and pin with which it is made up and a ring-shaped seal member of compressible material located in the annular groove, said seal member having a volume such that its volume will be substantially equal to the volume of the cavity after its volume is reduced up to about 15% when it it compressed by the mating threads extending into the groove and it is trapped in the cavity when the roots and crests of the mating threads engage.

8. The threaded member of claim 7 in which the threads are of dovetailed shape in cross-section.

9. The threaded pipe connection of claim 7 in which the width of the annular groove is equal to or greater than the pitch of the threads.

10. The threaded pipe connection of claims 7 or 8 in which the annular groove is in the box.

11. The threaded member of claim 7 in which the volume of the seal ring is reduced between 8–15%.

12. The threaded pipe connection of claim 7 in which the seal member is made of polytetrafluoroethylene.

* * * * *